Patented May 13, 1930

1,758,914

UNITED STATES PATENT OFFICE

SAMUEL S. SADTLER, OF SPRINGFIELD TOWNSHIP, MONTGOMERY COUNTY, PENNSYLVANIA, ASSIGNOR TO AMIESITE ASPHALT COMPANY OF AMERICA, OF CAMDEN, NEW JERSEY, A CORPORATION OF NEW JERSEY

ROAD-BUILDING MATERIAL AND METHOD OF MAKING THE SAME

No Drawing.   Application filed June 28, 1929. Serial No. 374,615.

In my copending application, Serial Number 366,770, filed May 28, 1929, I have disclosed an invention or discovery made by me which, briefly stated, comprises the fact that by adding a relatively small amount or quantity of rubber to a bituminous material, such as asphalt used in the construction of roads, pavements and the like, new properties and physical characteristics are imparted to the bituminous material which greatly facilitate the manipulation of the bituminous material during the mixing of the aggregate therewith by increasing the penetration, ductility and plasticity of the bituminous material, and also substantially increasing the water resistance, coherence, adherence and toughness of the binder in the finished pavement.

I have also discovered that the effects or results of the addition of these relatively small quantities of rubber to the bituminous material in the coating of aggregate with bituminous material, vary somewhat, dependent upon the mode or manner in which the ingredients are compounded or mixed together, and that if the rubber, either in solution or aqueous dispersion be applied to the aggregate prior to the introduction into the mixer of the asphalt, a better adhesion of the asphalt to the aggregate, a thicker coating of asphalt on the individual pieces of aggregate and a firmer more stable coherence of the coated pieces of aggregate to each other, are obtained than when the rubber is introduced at a later stage in the mixing or preparation of the material.

Because I may and preferably do use a very small quantity of rubber as compared with the quantity of aggregate, (for example, one-half of one pound of rubber to a batch of substantially a ton of aggregate,) it is not an easy matter, even in a pug mill, to effect an even distribution of the rubber throughout the batch of aggregate or to substantially cover all the surfaces of the individual pieces of aggregate with a film of rubber.

It is, therefore, one of the objects of my invention to provide a process or method whereby the said small quantities of rubber may be thoroughly distributed over the surfaces of the entire quantity of aggregate which is treated at one time in a pug mill, or similar mixing apparatus, and to do so before the asphalt or other bituminous material is added thereto.

Further objects of my invention are to provide a pavement wherein there is a very firm adherence of the bituminous coating to the individual pieces of aggregate and a similar firm coherence of the contacting pieces of coated aggregate; to provide a binder for a bituminous pavement which is not brittle when subjected to low climatic temperatures nor soft and unduly flowing when subjected to high climatic temperatures; to obtain a relatively thick coating of bituminous material more waterproof of water-repellent.

Other objects of my invention will appear in the specification and claims below.

In the process of road making to which my invention is particularly applicable, a slowly volatile liquefier, such as kerosene or other suitable solvent, is preferably employed in relatively small quantities to increase the fluidity of the asphalt during the step of mixing the asphaltic material with the aggregate and to prevent the agglomeration of the coated aggregate between the step of coating the same and the step of placing it on the roadway. Although the quantity of liquefier is also small, generally speaking, and as compared with the quantity of aggregate in a batch (for example, a gallon and a half of kerosene or similar material, to substantially a ton of aggregate,) it is sufficient to substantially cover the entire surface of all the pieces of aggregate in a mixer having capacity for mixing a ton of aggregate, even when the aggregate is dry, as it is in the process of the United States patent to Hepburn No. 1,611,444, dated December 21, 1926. Because this liquefier can be so thoroughly and readily distributed throughout the aggregate and since such liquefier, such as kerosene, naphtha, and the light coal tar solvents, are also solvents for a small quantity of rubber, I prefer to dissolve the rubber in such liquefier, or to add it thereto, and to then add the mixture or solution of the liquefier and rubber to the aggregate prior to the addition thereto of the hot asphalt or other bituminous material employed.

When kerosene is used as a liquefier, I am able to easily dissolve rubber in the kerosene up to substantially two per cent of the weight of the kerosene; that is to say, I make a two per cent solution of rubber in kerosene, and when, for instance, five quarts of such a solution of rubber in kerosene is added to a paving mixture in which there is to be added, for instance, one hundred pounds of asphalt, which is a typical quantity of asphalt to thoroughly coat the surfaces of substantially a ton of aggregate, (depending and varying, however, upon the size of the individual pieces of aggregate), that quantity of liquid liquefier may be readily uniformly distributed over the surfaces of all pieces in the pug mill or mixer commonly used for the purpose. After such a two per cent solution of rubber in kerosene has thus been distributed throughout the aggregate, the asphalt, preferably heated to a temperature of 250° F. is dumped into the mixer and the agitation of the mixture is continued. When so prepared, the rubber content of the liquefier will be substantially two tenths of one per cent of the weight of the asphalt.

The dissolving of the rubber in the liquefier may, however, be effected in the presence of the aggregate, that is to say, I may first add to the mass of aggregate being agitated in the pug mill or other mixer, the necessary quantity of the liquefier, such as kerosene and when that has been distributed over the surfaces of the pieces of aggregate, I may then add the rubber as, for instance, a 40% rubber latex or 1¼ pounds (less than a quart) of latex. The presence of water in the latex will not substantially interfere with the dissolving of the rubber in the liquefier and the water is removed from the mix later by the application of the hot asphalt to the aggregate in the pug mill.

A two per cent solution of rubber in kerosene is about as viscous a solution of rubber in kerosene as I would ordinarily wish to use, although by means of pressure in the supply tank for the liquefier, thicker solutions may be used. When I desire to obtain greater proportions of the rubber in the final mix, I ordinarily use other solvents as liquefiers. Thus I find that the light coal tar solvents of asphalt will readily dissolve substantially double this amount of rubber, or a four per cent rubber solution. When such liquefiers are used, the mode and time of adding the solution to the aggregate is the same as I have described in connection with the use of kerosene, and if the proportions, above given, are kept the same, there will be four tenths of one per cent of rubber in the asphalt binder of the product.

When I wish to incorporate in the finished asphaltic material of the pavement, a still greater amount of rubber, I preferably use, as a liquefier, an emulsion of a solvent of asphalt in latex. I emulsify the kerosene or other liquefier and I preferably do this by first emulsifying the latex. I agitate the latex with the emulsifying agent, such as sulphonated castor oil in a suitable emulsifying apparatus and when the emulsification of the latex is complete, I then slowly add the liquefier, such as kerosene, to the mixture. If the rubber latex has a suggestion of an excess of ammonia present, it is not necessary to add any other emulsifying agent. But I prefer to add a small quantity of sulphonated oil for the purpose. The presence of the small amount of water occurring in the latex, or in the sulphonated oil, does not interfere with the later adhesion of the asphalt to the pieces of aggregate in a thick coating because, as above pointed out, the asphalt which is added to the relatively cool dry aggregate is hot, that is to say, at a temperature of substantially 250° F. and the small quantity of water is almost immediately driven off as steam.

In one mode of using the process above outlined, I may make a rather concentrated emulsion of latex and kerosene or other liquefier and to add it to any additional quantities of any desired form of liquefier or solvent for bitumen. A satisfactory form of emulsion of this nature consists in an emulsion of rubber latex (40% strength), sulphonated castor oil and kerosene, all in equal volumes, for instance, one pint each. In making an emulsion of these materials better results will be obtained by adding the kerosene last during the agitation employed in making the emulsion.

In this emulsion the solid rubber content would be 4 pounds and the oils 1 quart. The content of rubber is high. If a lower rubber content is desired in the pavement binder, then a suitable quantity of this liquefier may be diluted with any suitable solvent of asphalt down to the desired percentage of rubber, and then a suitable quantity (from substantially one to one and a half gallons per ton of aggregate or per 100 pounds of asphalt) is added to the aggregate in the pug mill prior to the addition of the hot asphalt thereto.

Thus by diluting the equal volume mixture or emulsion above stated with 10 pints of a solvent of asphalt, (kerosene, naphtha, etc.), the resulting dilution would comprise 4 pounds rubber, 11 pints liquefier and 1 pint sulphonated castor oil or an oil content of 1½ gallons and a rubber content of .4 pound rubber.

When this liquefier is used with 100 pounds of asphalt in the mixer the rubber content of the binder will be substantially four tenths of one per cent of the weight of the asphalt.

In carrying out all the modifications of my process above described, it is to be observed that I have provided means whereby rubber, either in solution or in aqueous dispersion as in rubber latex, may be thoroughly mixed with and distributed over the individual pieces of aggregate prior to the addition of the hot asphaltic material to the mix, and in this way I am able to effect a very firm adhesion of a relatively thick coat of asphalt, or other bituminous material, firmly adhering to the surface of the individual pieces of aggregate. The solvent or liquefier acts substantially as it has heretofore been employed to act, that is to say, to temporarily render the asphaltic material fluent and workable in the presence of aggregate so that it can be thoroughly mixed therewith and after the coating step has been completed to prevent the individual pieces of coated aggregate from adhering tenaciously to each other prior to compression or compaction on the roadbed or roadway. The rubber thus added to the asphaltic material renders the asphalt more ductile, increases the penetration and resistance to water, makes it less susceptible to climatic changes and results in the formation of a thicker, tough, firm coating of asphaltic material on the individual pieces of asphalt.

Having thus described my invention, what I claim and desire to protect by Letters Patent of the United States is:

1. The method of making a paving material consisting of a graded aggregate coated with bituminous material which consists in adding from substantially one quarter of one part to substantially one part, by weight, of rubber, to from substantially 8 to 12 parts by weight of a liquefier of said bituminous material, adding the said mixture to substantially 1900 parts, by weight, of aggregate under agitation and thoroughly distributing said mixture over the surfaces of the individual pieces of said aggregate, and then adding to said aggregate so treated from substantially 35 to substantially 140 parts, by weight of said bituminous material and agitating the mass to thoroughly coat the individual pieces of aggregate with said bituminous material.

2. The method of making a paving material, consisting of a graded aggregate coated with bituminous material which consists in adding from substantially one quarter of one part to substantially one part, by weight, of rubber, to from substantially 8 to 12 parts by weight of a liquefier of said bituminous material, adding the said mixture to substantially 1900 parts, by weight, of aggregate under agitation and thoroughly distributing said mixture over the surfaces of the individual pieces of said aggregate, and then adding to said aggregate so treated from substantially 35 to substantially 140 parts, by weight of said bituminous material, heated to substantially 250° F., and agitating the mass to thoroughly coat the individual pieces of aggregate with said bituminous material.

3. The method of making a liquefier for bituminous materials used as the binders of bituminous pavements and the like, which consists in adding to a given volume of substantially 40% rubber latex, substantially an equal part by volume of sulphonated oil and emulsifying said ingredients by agitation, then slowly adding thereto an equal volume of a solvent of said bituminous material and emulsifying the same by agitation in said emulsion of latex and sulphonated oil.

4. The method of making a liquefier for bituminous materials used as the binders of bituminous pavements and the like, which consists in adding to a given volume of substantially 40% rubber latex, substantially an equal part by volume of sulphonated castor oil and emulsifying said ingredients by agitation, then slowly adding thereto an equal volume of a solvent of said bituminous material and emulsifying the same by agitation in said emulsion of latex and sulphonated oil.

5. The method of making a liquefier for bituminous materials used as the binders of bituminous pavements and the like, which consists in adding to a given volume of substantially 40% rubber latex, substantially an equal part by volume of sulphonated oil and emulsifying said ingredients by agitation, then slowly adding thereto an equal volume of a solvent of said bituminous material and emulsifying the same by agitation in said emulsion of latex and sulphonated oil, then diluting the same by adding thereto a solvent of said bituminous material to obtain any desired smaller proportion of rubber per gallon of solvent.

6. The method of making a paving material, which consists in first making a liquefier for bituminous material used as the binder of bituminous pavements and the like, which consists in adding, with agitation, to a given volume of substantially 40% rubber latex, a substantially equal part by volume of a sulphonated oil, then adding thereto an equal volume of a solvent for said bituminous material and agitating the mixture, then diluting the said mixture with a solvent of said bituminous material to obtain a substantially smaller proportion of said rubber content in said liquefier and then adding from one to one and a half gallons of said diluted liquefier to substantially 1900 pounds of aggregate and agitating said aggregate to thoroughly cover the surfaces of the pieces of aggregate with said liquefier, and while the agitation of said mixture is being continued, adding thereto a sufficient quantity of bituminous material heated to substantially 250° F. to thoroughly coat the surfaces of individual pieces of aggregate with said bituminous material.

7. The method of making a liquefier for bituminous paving material, which consists in adding, with agitation, to a given volume of rubber latex, an equal volume of sulphonated castor oil and an equal volume of a solvent of said bituminous material, then diluting said mixture if necessary, by adding thereto a liquefier of bitumen, the quantity of said liquefier so added thereto being sufficient to reduce the rubber content to from 2 to 10% of the weight of the solvents of bitumen therein.

8. The method of making a paving material, which consists in adding, with agitation, to a given volume of a rubber latex an equal volume of sulphonated castor oil, an equal volume of the solvent of bitumen, then diluting said mixture by adding thereto a solvent of bitumen down to a point wherein the rubber content is from substantially 2 to 10% of the weight of said liquefier and then adding from substantially one gallon to one and a half gallons of said diluted liquefier to substantially 1900 pounds of cold graded aggregate and agitating the same to distribute said liquefier thoroughly over the surfaces of said aggregate and then adding to said aggregate while the agitation is continued from 35 to 140 pounds of said bituminous material heated to substantially 150° F. to thoroughly coat the individual pieces of said aggregate and with said bituminous material.

In witness whereof, I have hereunto set my hand this 27th day of June, 1929.

SAMUEL S. SADTLER.